United States Patent

Kato et al.

[15] 3,643,846

[45] Feb. 22, 1972

[54] TEMPORARY STOP DEVICE FOR TAPE RECORDER

[72] Inventors: Yoshiro Kato, Yokohama Kimio Uno, Kamakura both of Japan

[73] Assignee: Victor Company of Japan, Limited, Yokohama, Japan

[22] Filed: June 19, 1969

[21] Appl. No.: 834,767

[30] Foreign Application Priority Data

June 22, 1968 Japan....................................43/5239

[52] U.S. Cl...............................................226/181, 226/155

[51] Int. Cl.........................................................B65h 17/22

[58] Field of Search..................226/181, 180, 179, 186, 154, 226/155, 176

[56] References Cited

UNITED STATES PATENTS

| | | | |
|---|---|---|---|
| 3,148,819 | 9/1964 | Frick et al. | 226/186 X |
| 3,285,486 | 11/1966 | Tamura et al | 226/180 |

*Primary Examiner*—Richard A. Schacher
*Assistant Examiner*—Gene A. Church
*Attorney*—Holman & Stern

[57] ABSTRACT

A temporary stop device for tape recorder temporarily or transiently stopping the running of a tape by parting a pinch roller from a rotating capstan which is contacted with the pinch roller by compression and thereafter instantly running the tape by contacting the pinch roller with the capstan. Contacting and parting operations of the pinch roller with and from the capstan are made by a cam means. A cam operation switch and a tape running indication part are housed in a remote control part at some distance apart from the tape recorder body.

4 Claims, 5 Drawing Figures

INVENTORS
YOSHIRO KATO
KIMIO UNO
BY Holman, Glascock, Downing & Seebold
ATTORNEYS INVENTORS
Yoshiro Kato
Kimio Uno
BY Holman, Glascock, Downing & Seebold
ATTORNEYS

TEMPORARY STOP DEVICE FOR TAPE RECORDER

BACKGROUND OF THE INVENTION

This invention relates to a temporary stop device for tape recorder and more particularly to a device for temporarily stopping the running of a tape in a tape recorder used for office work which can temporarily stop the running of a tape by remote control and thereafter immediately start the running of a tape again for recording.

In operating a tape recorder generally in use for office or business work such as a so-called dictating tape recorder, the dictating or recording operation is scarcely made continuously in the course of recording but usually the operation is often interrupted or intermitted at some intervals during recording. It has therefore been necessary to temporarily or transiently stop the running of a tape for nonrecording time so as to make an effective use of a tape and thereafter instantly or immediately run the tape at the same predetermined speed. Since it is customary to set a tape recorder at a location some distance from the place of operator who records into a tape through a microphone, it is desired that the tape recorder may be operated by remote control and much more preferably, the running or stopping of a tape may be indicated for the indicator.

The present invention has been devised to comply with the above-mentioned requirements.

SUMMARY OF THE INVENTION

A primary object of the present invention is to provide a temporary or transient stop device for a tape recorder which is so designed that a tape running can be temporarily stopped and thereafter instantly started again to run at a predetermined speed.

Another object of the invention is to provide a temporary stop device for a tape recorder which can apply remote control both in the temporary stopping and the instant starting of the running at a place some distance apart from the tape recorder.

Still another object of the invention is to provide a temporary stop device for a tape recorder which can electrically indicate on a remote control part, the stopping and starting of the running of the tape in the tape recorder.

A further object of the invention is to provide a device for stopping temporarily the running of a tape which is particularly adapted for a small tape recorder of the cassette type.

Other objects and features of the invention will be apparent from the description as hereinafter provided in detail with reference to the accompanying drawings, in which:

DETAILED DESCRIPTION OF THE INVENTION

Figures 1, 2:
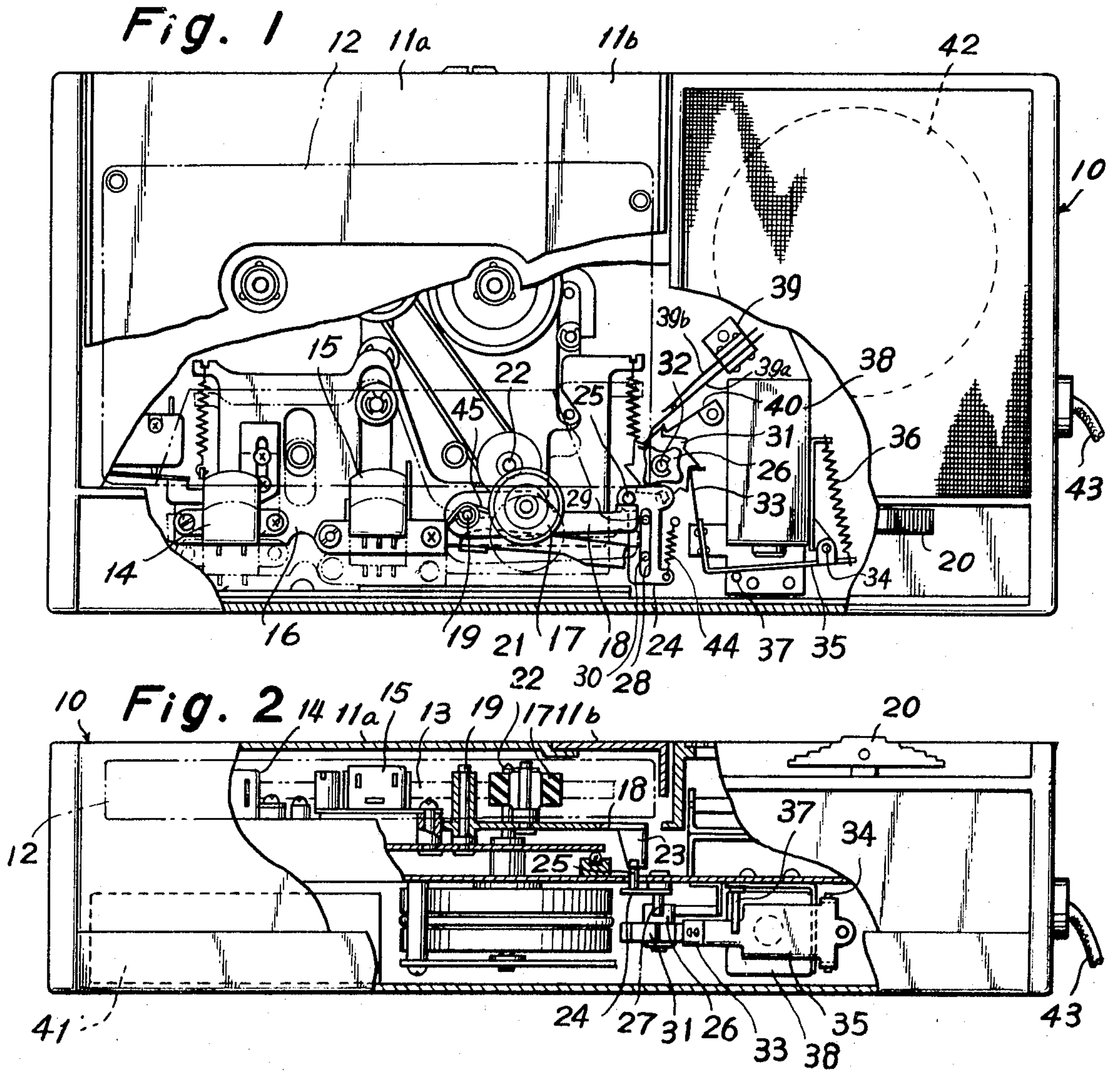
FIG. 1 is a partially sectional plan view of an embodiment of a tape recorder in which a temporary stop device according to the invention is applied.
FIG. 2 is a partially sectional front view of the tape recorder in FIG. 1.

FIGS. 1 and 2 show respectively a small-type tape recorder of the cassette type in which an embodiment of the temporary stop device of the invention is applied. For starting the operation of the tape recorder, lids 11*a* and 11*b* of a tape recorder casing 10 are opened upwardly and a cassette 12 with a tape 13 therein is loaded in the casing.

In this case, a head sliding baseplate 16 is located as designated by broken lines in FIG. 1 and also an erasing magnetic head 14 and a recording and reproducing magnetic head 15 secured to said sliding baseplate 16 are located in positions indicated by broken lines thereby presenting no problems to the loading of the cassette 12 into the casing 10. A pinch roller 17 is rotatably mounted on a lever 18 of which one end is pivoted about a shaft 19 on the sliding baseplate 16. After loading of the cassette 12, a record and reproduce button 20 may be slid to the right, whereupon a lever 21 turns in a clockwise direction by a lever and cam mechanism (not shown) pushing the sliding baseplate 16 forwardly and moves the plate from the position of the broken lines to a position indicated by full lines. The magnetic heads 14, 15 and the pinch roller 17 are introduced into the cassette 12 via an opening in front of the cassette 12 and reach the position indicated by the full lines, respectively contacting with the tape 13. There is provided a capstan 22 fitted into the cassette 12 through an opening provided on the bottom of the cassette when the cassette is loaded. Therefore, when the pinch roller 17 moves to the position shown by the full lines as described above, the pinch roller may carry the tape 13 forward and urge it to run by rotation of the capstan 22.

On the forward end of the lever 18 is provided an engaging portion 23 which is bent downwardly. A sliding plate 24 has a pin 25 projecting from the upper surface thereof to engage with the engaging portion 23 and on the lower surface thereof a pin 27 to contact with the peripheral surface of a cam 26. The sliding plate 24 also has a long groove 28 to slide therealong by guidance of guide pins 29 and 30. The above-described cam 26 has respectively four crests and valleys and rotates around a shaft 32 together with a ratchet 31 having eight projecting teeth. A spring 33 for rotating the ratchet has a forward end in engagement with the teeth of the ratchet 31 and the other end secured to a movable member 35 which turns about a shaft 34. The movable member 35 is hung by a tension spring 36 at its end and turns to a position of engagement with a stop 37 by a force turning in a counterclockwise direction. When an electromagnet 38 is operated, the member 35 is pulled by the magnet and turns in a clockwise direction.

A leaf switch 39 is provided to work as a normally open switch. The forward end of a movable leaf 39*a* thereof contacts in compression with the peripheral surface of the cam 26 at all times, and contacts with or parts from a fixed leaf 39*b* corresponding to the figure of the peripheral surface of the cam. By a spring 40, the ratchet 31 is prevented from making a reverse rotation.

The above-described tape recorder casing 10 has four battery cells 41 on the bottom inside the casing and a speaker 42 on the upper surface thereof. From a side of the casing 10 is extended an outlet cord 43 of a preferred length.

Figure 3:
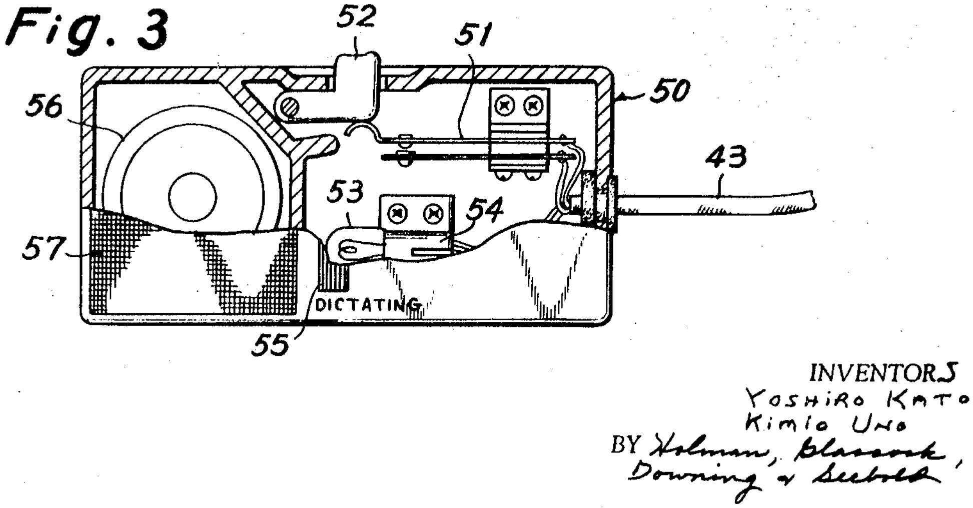
FIG. 3 is a partially sectional plan view of a hand microphone having a remote control part incorporated therein.

FIG. 3 shows a plan view of a hand microphone in which the cord 43 is connected to the inside of a casing 50. The casing 50 of the hand microphone is of such dimensions as to be supported by grasping in a hand. A normally open switch 51 can be opened or closed by an operating button 52 and constitutes a remote control part. In the casing 50 there is provided an indicator lamp 53 carried by a support 54. At a point corresponding to the lamp 53 on the casing 50 is provided an indicator part 55 for indicating the lighting of the lamp 53. A microphone 56 is provided under a cover 57 having meshed holes.

Figures 4, 5:
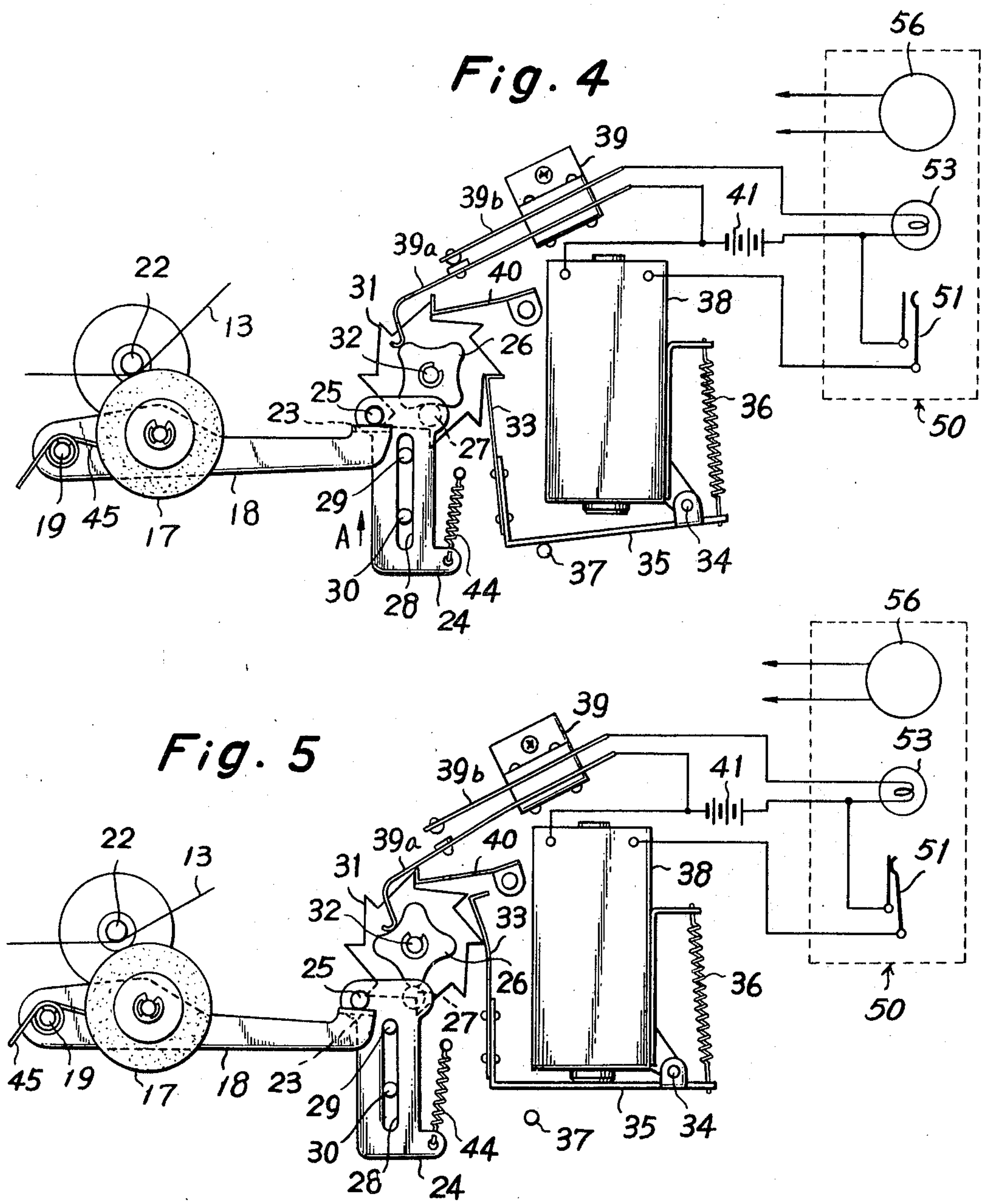
FIG. 4 is a plan view illustrating the operation of the embodiment of the temporary stop device of FIG. 1 in a state in which a tape is running.
FIG. 5 is a plan view illustrating the operation of the device in a state in which a tape is temporarily stopped running.

In order to illustrate the operation of the device including the above remote control part and the indicator reference is made to FIGS. 4 and 5.

As described above, after the cassette 12 is loaded in the tape recorder casing 10, the button 20 is slid and thereby the pinch roller 17 is compressed to the capstan 22 and causes the tape 13 to run. Simultaneously, the heads 14 and 15 are brought to contact with the tape 13 and record the audio signals from the microphone 56. This state of operation is illustrated in FIG. 4 in which the pin 27 is shown being in contact with a valley or the cam 26 and the sliding plate 24 being situated by a spring 44 at a most deviated position in the direction of an arrow A. Besides, the lever 18 is applied a rotating force in the counterclockwise direction by a spring 45. In this position the switch 51 is being opened and the electromagnet 38 is out of operation while on the other hand the switch 39 is closed as the forward end of the movable leaf 39*a* is in contact with a crest of the cam 26 and contacts with the fixed leaf 39*b*, whereby the lamp 53 is closed to a power source 41 through the switch 39, and the lamp 53 is lit. Therefore, while the recording or reproducing operation is in progress by running of a tape, the lighting of the lamp 53 appears on the indicator part 55 to provide an ample convenience for indicating of the operation of the tape recorder especially in the above case that the hand microphone including the remote control part is operated at a position distant from the tape recorder body.

When it is desired to temporarily stop the running of the tape 13, an operator may close the switch 51 by pushing of the button 52. As shown in FIG. 5, when the switch 51 is closed, the electromagnet 38 is closed to the power source 41 through the switch 51, thus pulling the movable member 35 against the force of the spring 36 and turns it in a clockwise direction. On the turning of movable member 35, the ratchet 31 is rotated in a counterclockwise direction of one tooth by the spring 33. By rotation of the ratchet 31 by one tooth, the cam 26 integrated with the ratchet rotates whereby the pin 27 enters into contact with a crest of the cam 26 and the sliding plate 24 slides in the reverse direction of the arrow A against the force of the spring 44. By sliding of the sliding plate 24, the pin 25 pushes the engaging portion 23 of the lever 18. Then, the lever 18 turns in a clockwise direction about the shaft 19 against the force of the spring 45. Thus, the pinch roller 17 is parted from the capstan 22. Though the capstan 22 continues its rotation, the running of the tape 13 is stopped as the tape is released from engagement with the capstan 22 by the pinch roller 17.

With the above-mentioned rotation of the cam 26, the forward end of the movable leaf 39*a* of the switch 39 contacts a valley of the cam 26 so that the leaf 39*a* is parted from the fixed leaf 39*b* and the switch 39 is opened. When the switch 39 is opened, the lamp 53 is extinguished and indicates that the running of the tape 13 is now stopped.

Moreover, if the button 52 is free, the switch 51 is opened and the electromagnet 38 becomes inoperative. The electromagnet 38 being out of operation means the movable member 35 returns to a position for engagement with the stop 37 by force of the spring 36, whereupon the spring 33 moves back and engages with an adjacent tooth of the ratchet 31.

By closing the switch 51 again, the electromagnet 38 operates again and the ratchet 31 is turned by one tooth. The pin 27 contacts an adjacent valley of the periphery of the cam 26 so that the sliding plate 24 moves in the direction of the arrow A and the lever 18 turns in a counterclockwise direction. Then, as shown in FIG. 4, the pinch roller 17 presses again the capstan 22 causing the tape 13 to run. In this position, the capstan 22 continues its rotation so that when the pinch roller 17 is pressed to the capstan 22, the tape 13 starts again to run instantly at the predetermined speed. Also when the leaf 39*a* contacts a crest of the cam 26, the switch 39 closes and the lamp 53 is lit indicating the dictating operation is ready.

Similarly, the ratchet 31 may be turned by one tooth by each operation of the switch 51 and the running and stopping of the tape 13 is repeated as desired.

The electromagnet 38 may be operated just for the time that the ratchet 31 is turned by one tooth so that the switch 51 may be closed only for a short period of time. As a consequence, electric power is not consumed greatly and the battery cell 41 is not greatly wasted. With the cord 43 of the preferred length, the operator may well operate the tape recorder 10 at a desired position apart from the tape recorder by operating the remote control part.

In the above-described embodiment, the device is so designed that the lever with a pinch roller may turn corresponding to the sliding movement of the sliding plate with a pin contacting with the cam. However, the invention is not limited to the embodiment as defined above but it may also be constructed so that the forward end of the lever or the pin on the lever directly contacts with the periphery of the cam surface. Moreover, various modifications and variations thereof will be apparent to those skilled in the art without departing from the scope of which is set forth in the appended claims.

We claim:

1. A temporary stop device for a tape recorder comprising a rotating capstan, a pinch roller urging a tape into running with said capstan, a lever carrying said pinch roller and pivoted on a shaft to be rotatable with the pinch roller for contacting or parting said pinch roller with or from said capstan, a rotary cam having crests and valleys on the peripheral surface thereof for turning said lever along the peripheral surface, a ratchet integral with the rotary cam, an electromagnet having a forwarding member in engagement with the ratchet, first switch means for energizing said electromagnet whereby said cam is turned, second switch means including a movable leaf engaged with the peripheral surface of said cam for closing when said cam is turned to contact said pinch roller with said capstan and opening when said cam is turned to part said pinch roller from said capstan, and lighting and indicator means to light a lamp in response to closing of said second switch means.

2. The temporary stop device for a tape recorder as claimed in claim 1 wherein said first switch means includes a switch serially connected to a series combination of a power source and said electromagnet, and said lighting and indicator means include a series combination of said lamp, said second switch means and said power source.

3. The temporary stop device for tape recorder claimed in claim 2 wherein said lamp and said switch are housed in a casing separately from the power source, the electromagnet and the second switch means so as to control remotely the energization of the electromagnet.

4. The temporary stop device for tape recorder claimed in claim 1 wherein said forwarding member turns the rotary cam through said ratchet in one pitch between its adjacent crest and valley in response to the energization of the electromagnet.

* * * * *